July 3, 1962 G. DAVIS 3,042,234
MATERIAL MOVING AND PLACING APPARATUS
Filed Aug. 4, 1960 5 Sheets-Sheet 1

INVENTOR.
GEORGE DAVIS
BY M. A. Hobbs
ATTORNEY

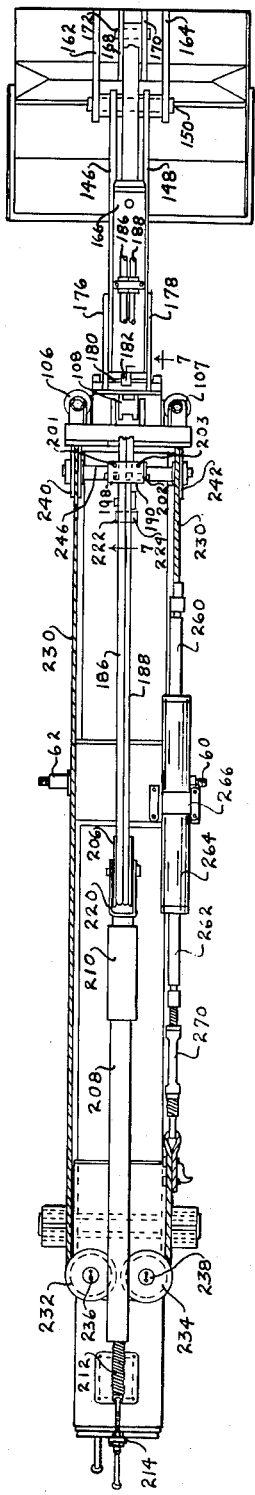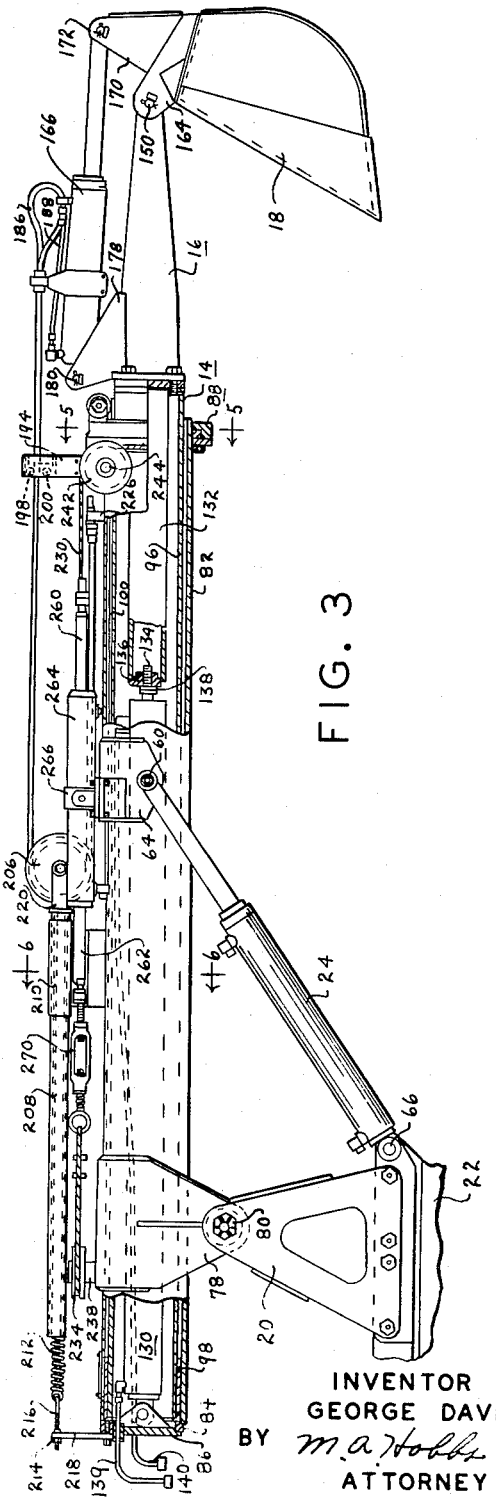

July 3, 1962  G. DAVIS  3,042,234
MATERIAL MOVING AND PLACING APPARATUS
Filed Aug. 4, 1960   5 Sheets-Sheet 3

INVENTOR.
GEORGE DAVIS
BY M. A. Hobbs
ATTORNEY

July 3, 1962 G. DAVIS 3,042,234
MATERIAL MOVING AND PLACING APPARATUS
Filed Aug. 4, 1960 5 Sheets-Sheet 4

INVENTOR.
GEORGE DAVIS
BY
M. A. Hobbs
ATTORNEY

INVENTOR.
GEORGE DAVIS
BY M. A. Hobbs
ATTORNEY

United States Patent Office 3,042,234
Patented July 3, 1962

3,042,234
MATERIAL MOVING AND PLACING APPARATUS
George Davis, Dowagiac, Mich., assignor to Davis Engineering, Inc., Dowagiac, Mich., a corporation of Michigan
Filed Aug. 4, 1960, Ser. No. 47,451
17 Claims. (Cl. 214—141)

The present invention relates to a multi-purpose material moving and placing apparatus, and more particularly to earth working and handling apparatus.

Conventional multi-purpose machines of this type have a number of disadvantages. In the first place, these machines are complicated, with many parts exposed to the dangers of dirt and blows, and are often difficult to build as well as to maintain. This fact is especially disadvantageous in road building and other such projects, since the machinery breaking down on the job must be quickly repaired or replaced in order not to delay the work. The complicated machinery usually requires more service and attention and is more difficult to repair on the job without special tools and trained personnel. Furthermore, the conventional equipment often includes material working or handling tools near a bulky body, or a tool on the end of a complicated, bulky boom, sometimes with several shafts and cables to control the tool. Even with this equipment, the machinery is frequently severely limited in the types of operations that it can perform, and often cannot operate in close places because of its bulk. In addition, the machines with the tool near the body, such as bull-dozers, are limited by such factors as the slope of the terrain and the presence of water. Therefore, one of the principal objects of the present invention is to provide a relatively simple working and handling apparatus which enables an operator to perform the functions of a power shovel, grader, bull-dozer, sloper, motor patrol, ditcher and the like, efficiently and under a variety of operating conditions without regard to the conditions of the immediate terrain or operational environment.

Another object of the present invention is to provide a boom which will perform the above functions both close to the boom carrier, remote from the carrier, and at any point between those two positions, and which can readily be varied by the operator of the boom while the machine is in operation.

Still another object of this invention is to provide a boom which can rotate about its longitudinal axis at the will of the operator so that the tool at the end can be adjusted to the angle of a surface, thus permitting an operator to smooth, grade, or maintain surfaces where an ordinary bull-dozer, grader, or other machines with the blade near the body of the machine cannot reach, due to the slope or unusual contour of the surface.

A further object of the present invention is to provide a boom which will permit the ready change from one tool to another and which is so constructed and arranged that it can use conventional or standard earth working and handling tools.

Still another object of the invention is to provide a boom with all of the above advantages which can be precisely controlled by simple controls and which thus requires only a minimum of training for operators.

An additional object is to provide a boom which can be mounted on a truck or other base vehicle in such a manner that the whole apparatus may be moved along the highway or road and immediately set into operation at a desired site without the use of special apparatus for unloading or other preparation.

Another object is to provide a boom mountable together with its controls, a cab and all necessary engines and other equipment, in such a way that the assembly can be rotated on the truck, tractor or other base vehicle with continuous 360° motion, thus allowing digging, grading, smoothing, dumping or loading at any position around the vehicle within the greatest extension of the boom.

Another object is to provide a boom which may be fabricated from standard, readily available materials and thus may be produced more cheaply using conventional machine tools and fabricating equipment.

Additional objects and advantages of the present invention will become apparent from the following description and accompanying drawings, wherein:

FIGURE 2 is a top plan view of my boom with a hoe-type scoop mounted thereon;

FIGURE 3 is a side elevational and partial vertical cross sectional view of the boom shown in FIGURE 2;

Figure 1:
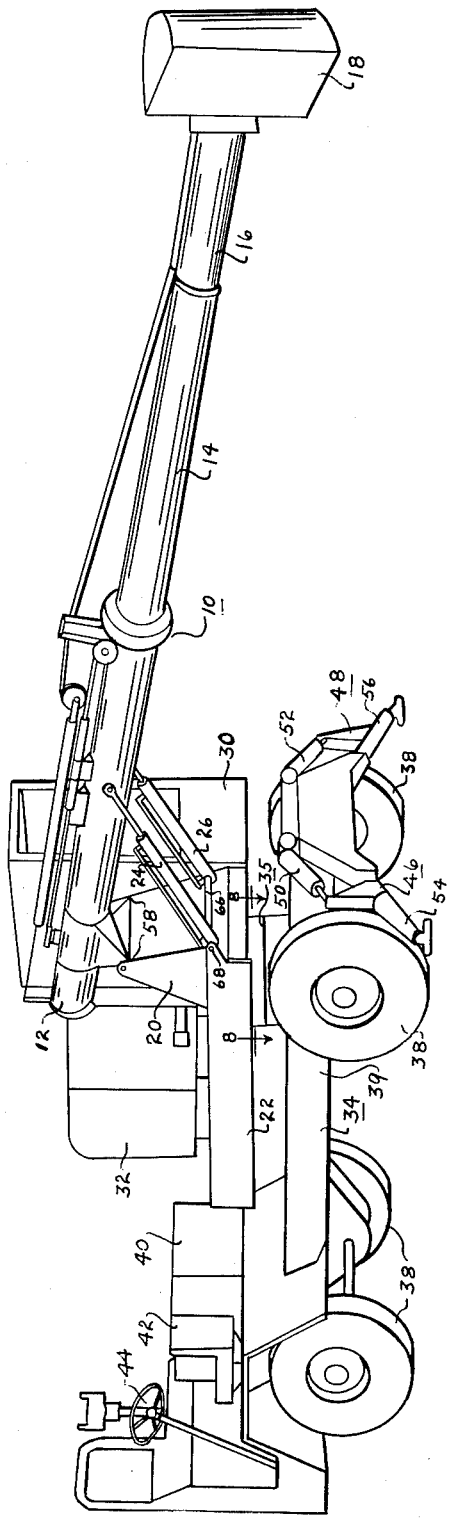
FIGURE 1 is a perspective view of an excavator showing my boom in extended position mounted thereon.
Figure 4:
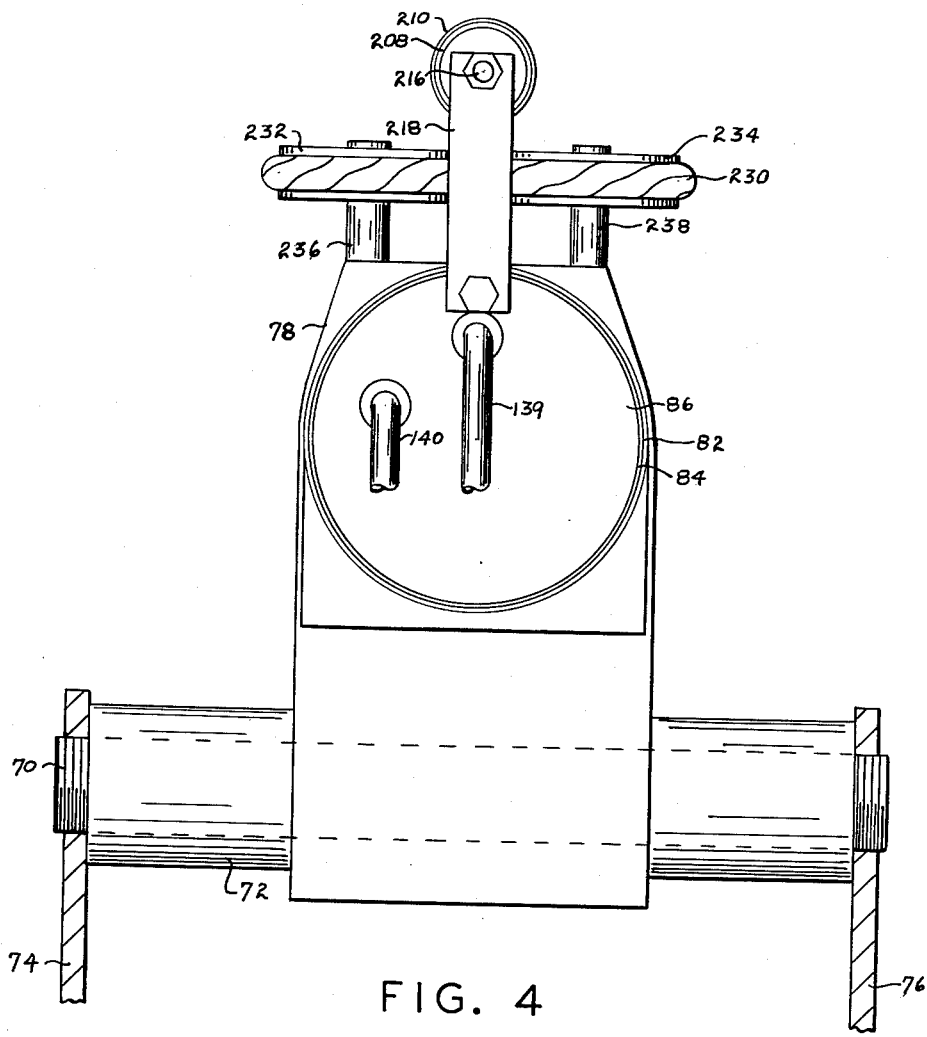
FIGURE 4 is an end view of the boom shown in the preceding figures.
Figure 8:
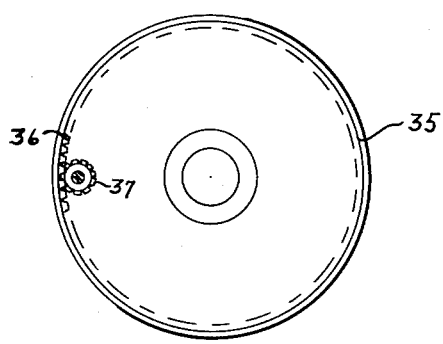
FIGURE 8 is a view of the mechanism for rotating the boom platform on a horizontal plane, taken on line 8—8 of FIGURE 1.
Figure 5:
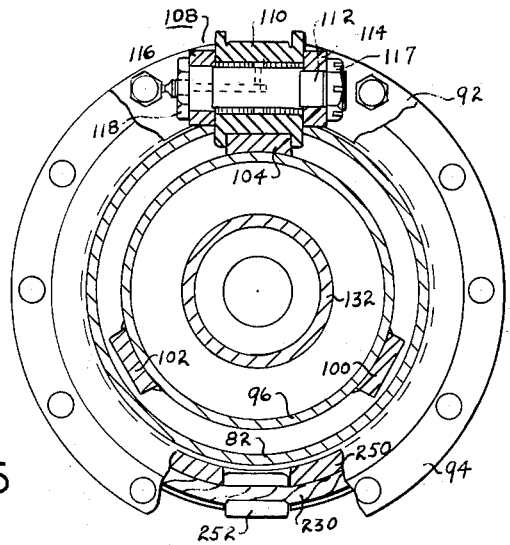
FIGURE 5 is a cross sectional view of the boom taken on line 5—5 of FIGURE 3.
Figure 6:
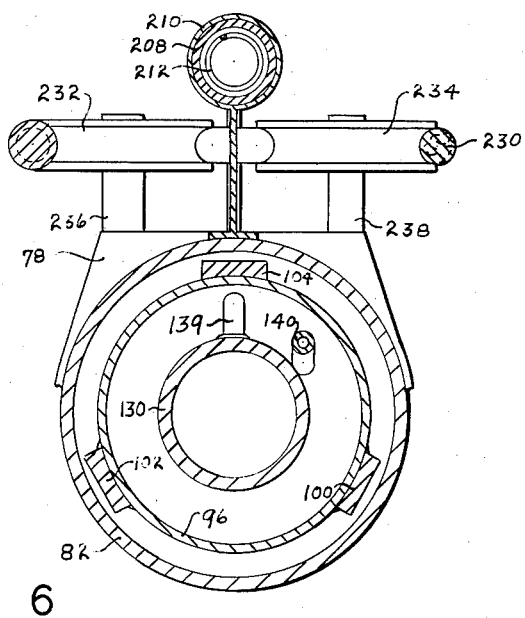
FIGURE 6 is a cross sectional view of the boom taken on line 6—6 of FIGURE 3.
Figure 7:
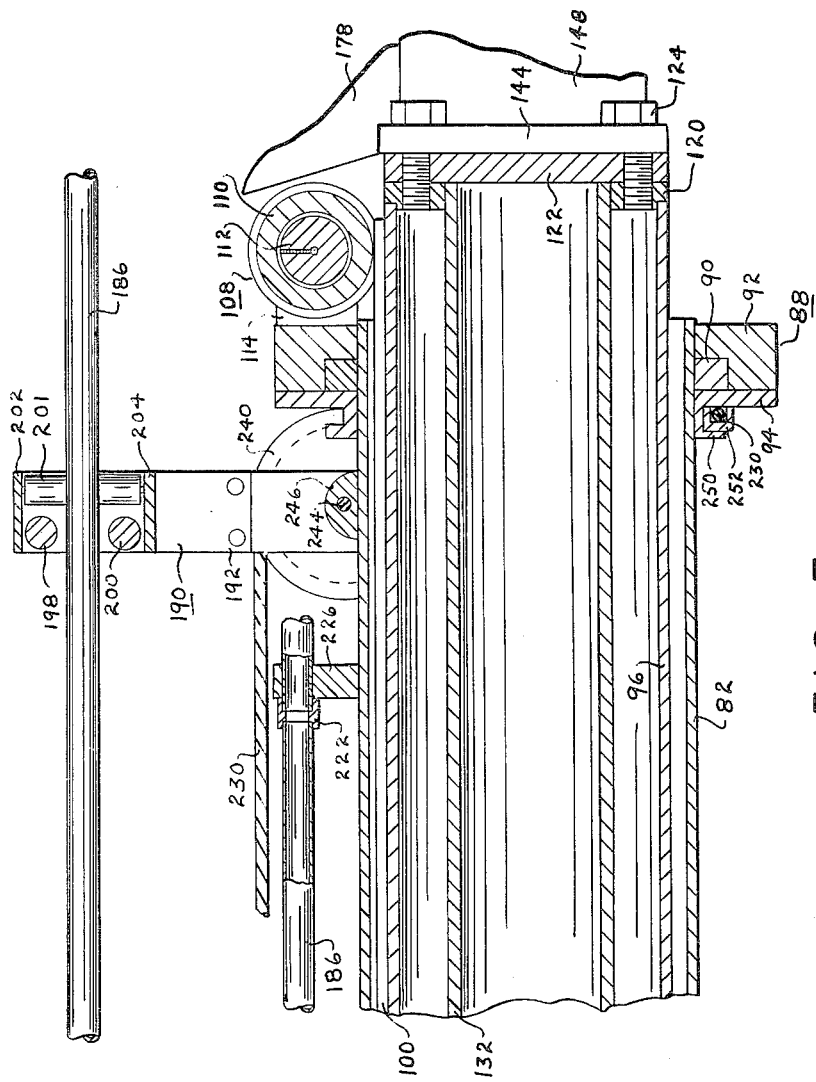
FIGURE 7 is an enlarged fragmentary cross sectional view taken on line 7—7 of FIGURE 2.

Referring to the drawings, and more specifically to FIGURE 1, numeral 10 designates my boom consisting of a base section 12, a telescopic section 14, and an end section 16 having mounted thereon a hoe-type scoop 18. The boom is pivotally mounted on a support 20 secured to a platform 22 and is operated in a vertical plane by a pair of hydraulic cylinders 24 and 26 pivotally connected at one end to the platform and at the other end to the sides of the boom. The platform also supports a cab 30 and an engine and hydraulic pumps enclosed in the hood 32, and is rotatably mounted on a truck 34 or other suitable vehicle by a pivot mechanism 35 driven through 360° by gears 36 and 37, for example, from the engine. The truck 34 may be considered a conventional vehicle consisting of wheels 38, bed 39, engine 40, driver's seat 42, and controls 44, and having mounted on its rear end outriggers 46 and 48 consisting of hydraulic cylinders 50 and 52 and jacks 54 and 56 to give support to the vehicle when the boom is in operation. It is clear from FIGURE 1 that the boom 10 may be raised and lowered around the pivot 58 by means of hydraulic cylinders 24 and 26 operating in unison, the scoop 18 being at its highest ponit when cylinders 24 and 26 are fully extended, and at its lowest when they are fully retracted. In the model shown, this construction has enabled the boom to vary from approximately 45° below its horizontal position to 30° above the horizontal.

As seen in FIGURE 1, the equipment for operating the boom is supported on the platform 22 and on the boom itself, and can be rotated 360° continuously on the pivot mechanism 35. The means of rotation may be gears, or any of several other types of drive mechanisms, although the present invention is not limited to any particular type of mechanism, nor is it limited to the particular truck, outriggers, engines and pumps, cab, or scoop shown. The outriggers may be operated from the cab 30 by suitable means not shown.

Hydraulic cylinders 24 and 26 are connected to the boom by pivot pins 60 and 62, secured to the opposite sides of the boom by a yoke 64 welded or otherwise secured to the base section and to platform 22 by a shaft 66 supported at its ends by a projection 68 on each side of the platform. The boom 10 is pivotally mounted on support 20 by an axle 70 extending through a hub member 72 of the boom and through two laterally spaced, upwardly extending members 74 and 76 of support 20, hub 72 being rigidly secured to base section 12 by a yoke 78 extending over the top of and being welded to said base section. The ends of axle 70 are threaded to receive securing nuts 80 thereon to retain the boom in operating position on the support 20.

The base section 12 of the boom consists of a tube 82 closed at the rear end by a ring 84 and plate 86 and having at the other end an assembly 88 for telescopically supporting section 14, said assembly consisting of a ring 90 rigidly secured to the external surface of tube 82, a rotatable ring 92 held against axial movement on the tube by a retainer ring 94 secured by any suitable means such as bolts to rotatable ring 92.

Tube 96 of telescopic section 14 slides longitudinally and rotates within tube 82 and is supported in spaced relation at its inner end from the internal wall of tube 82 by a spacer ring 98 joined to the external surface of tube 96 and, throughout the length thereof, by three longitudinal tracks 100, 102 and 104 equally spaced around and secured to the external surface of tube 96. The tracks are supported in spaced relation from the internal wall of tube 82 by three roller assemblies, 106, 107 and 108, each assembly consisting of a flanged roller 110, the hub of which engages the outer surface of the respective track and the flanges of which engage the sides of the track. The roller is mounted on a shaft 112 the ends of which are rigidly supported by arms 114 and 116 rigidly secured to and rotatable with ring 92, the shaft being retained firmly in place by nuts 117 and 118. It is seen from this construction that rotation of ring 92 moves the three spaced rollers circumferentially around the boom, and the roller flanges in turn bear against one side or the other of the respective tracks and rotate tube 96 within tube 82. The rollers 110 are adjustable toward and away from the respective track by making shaft 112 eccentric with respect to the holes in arms 114 and 116 so that, upon rotation of shaft 112 after nuts 117 and 118 have been loosened, the roller will be raised or lowered. This permits the rollers to be readily and effectively positioned as wear occurs during operation of the apparatus.

Tube 96 of telescopic section 14 is open at its inner end and is closed at its outer end by a ring 120 welded or otherwise secured to the end of the tube and a plate 122 secured to ring 120 by a plurality of bolts 124. Tube 96 is moved longitudinally within tube 82 by a double acting hydraulic cylinder 130 disposed within tubes 82 and 96 and connected at its forward end to plate 122 by a cylinder 132 and bolt 134 which is attached to cylinder 132 by a plate 136 and to the adjacent end of cylinder 130 by a bearing 138, said bearing having rotative parts to permit relative rotation between cylinders 130 and 132. Hydraulic cylinder 130 is pivotally connected to plate 86 of base section 12, and the cylinder is supplied with the operating fluid through tubes 139 and 140 extending through plate 86 and connected to the operating controls by suitable flexible tubing. With this construction, operation of hydraulic cylinder 130 moves telescopic section 14 outwardly from the position shown in FIGURES 2 and 3 to the extended position shown in FIGURE 1, tube 96 of said telescopic section being supported throughout its longitudinal movement between its retracted and extended positions by tracks 100, 102 and 104 and respective rollers 110.

End section 16 which pivotally supports scoop 18 is secured to the telescopic section by a plate 144 rigidly joined to the base of end section 16 by welding or other suitable means, and to the adjacent end of telescopic section 14 by bolts 124 extending through plate 144 into plate 122 and ring 120. Section 16 consists of two parallel side members 146 and 148 spaced from one another and joined to plate 144 at one end and supporting scoop 18 on the other end by means of a shaft 150 extending through aligned holes in the outer ends of members 146 and 148. The scoop is supported on shaft 150 by spaced arms 162 and 164 and is moved to various adjusted positions by hydraulic cylinder 166, the piston rod of which is attached to upwardly projecting spaced arms 168 and 170 by a pin 172 and the closed end of which is pivotally supported on end section 16 by spaced members 176 and 178 secured to members 146 and 148 and connected to cylinder 166 by a pin 180 extending through members 176 and 178 and through a lug 182 on the end of cylinder 166.

Hydraulic cylinder 166 is supplied with hydraulic fluid from the supply pumps through two flexible lines 186 and 188 connected at opposite ends of cylinder 166 and held in position on the upper side of the base section 12 by a guide member 190 consisting of two upright members 192 and 194 secured to tube 82 near the forward end thereof and having two horizontal rollers 198 and 200 journalled in members 192 and 194, and two vertical rollers 201 and 203 journalled in upper and lower cross members 202 and 204. The two flexible lines move freely between the rollers and are held in position above the base section where they will not interfere with the operation of the boom, and are also held in a taut condition above the base section by a sheave 206 supported on one end of a yieldable mechanism consisting of two telescopic sections 208 and 210 containing a long, relatively weak coil spring 212 attached at one end to section 208 and at the other end to a fixture 214 and acting longitudinally within section 208. Fixture 214 consists of a longitudinal threaded shaft 216 having a pair of nuts threaded thereon and disposed on opposite sides of an upright rigid member 218 secured at its base to the end of base section 12 of the boom. The tension on spring 212 may be readily adjusted by rotating the two nuts to the required position on shaft 216. Sheave 206 is attached to the end section 210 by a bifurcated bracket 220 and is adapted to move longitudinally on the base section as the telescopic section 14 of the boom is extended and retracted, as will be more fully described hereinafter. Flexible lines 186 and 188 are looped over sheave 206 and connected to couplings 222 and 224 mounted on and held in fixed position by a bracket 226. The lines to the hydraulic fluid controls and supply pump are connected to the couplings.

Telescopic section 14 is rotated about its longitudinal axis to place the scoop at various transverse angular positions by a mechanism consisting of a cable 230 supported on top of base section 12 along each side thereof by sheaves 232 and 234 journalled on vertical shafts 236 and 238 secured to said base adjacent the rear end of base section 12 and on sheaves 240 and 242 journalled on a shaft 244 supported on the upper side of base 12 at assembly 88 by a fixture 246. The cable extends downwardly along the side of assembly 88 in an annular groove formed by channel member 250 and secured thereto in the center of the peripheral bottom of said groove by a small clamping lug 252. Channel member 250 is secured to ring 94 and rotates in unison with said ring and ring 92. One end of cable 230 is secured to rod 260 and the other end is secured to rod 262 of a double acting hydraulic cylinder 264 mounted on the upper side of base 12 and secured thereto by a fixture 266. In order to vary the tension on the cable, a turnbuckle 270 or the like is preferably inserted in the cable at some suitable position such as the position shown in FIGURES 2 and 3. As the double acting cylinder 264 is operated so as to move rods 260 and 262 to the right as shown in FIGURES 2 and 3, cable 230 moves circumferentially in the groove of annular member 250, thereby rotating rings 94 and 92 and moving roller assemblies 106, 107 and 108 circumferentially around the forward end of base section 12. Since the flanges on each roller 110 of the assemblies extend along the sides of the respective tracks, circumferential movement of the rollers rotates telescopic section 14, and as telescopic section 14 rotates, scoop 18 moves to the desired angular position.

With the boom just described mounted on a suitable base vehicle, the functions of a scraper, power shovel, grader, bull-dozer, sloper, motor patrol, ditcher and the like are readily performed. Earth and other materials may be raised or lowered by the operation of hydraulic cylinders 24 and 26, and thus ditches may be dug and mounds built as with a power shovel or ditcher. Digging is facilitated by hydraulic cylinder 166 which acts to pivot scoop 18 around shaft 150 and can thus move the scoop to dig into the earth, hold it in a desired position, or rotate it about the shaft to unload the scoop. In operation, the boom can be lowered to the material to be moved, and cylinder 166 extended to force the blade of scoop 18 into the material. While the boom is being raised and rotated to the dumping site, the cylinder is not actuated, and the material is held in the scoop, but when it is desired to unload the scoop, the cylinder need be simply retracted. Furthermore, it is possible to empty the scoop over a wide area as the boom is being moved by allowing cylinder 166 to retract slowly and continuously.

When it is desired to telescope the boom to increase or decrease the distance of operation from the base vehicle, hydraulic cylinder 130 is actuated, as previously described. As sections 14 and 16 move forward, they carry along cylinder 166, and its supply lines 186 and 188. These lines ride on sheave 206 and pull it forward with them against the slight resistance of spring 212, this motion being guided by telescopic sections 208 and 210. When sections 14 and 16 are retracted again, the tension on lines 186 and 188 is released and the force of spring 212 is strong enough to pull back sheave 206 and bring the lines into a taut condition again. Thus the telescopic action of the boom can be utilized freely without lines 186 and 188 ever becoming tangled in projecting parts of the apparatus or in the mechanism of the boom itself.

With the telescopic action of the boom and the additional rotational movement of sections 14 and 16 around the longitudinal axis of the boom produced by the action of cylinder 264, cable 230, and assembly 88, the boom is extremely versatile. The boom can be reciprocated telescopically to act as a scraper, maintaining the scraping action on a plane with the ground without moving the base vehicle, and for greater effectiveness for some jobs, a scraper may be utilized with both reciprocating and sluing actions of the boom. Further, if it is desired to smooth, grade, or maintain a surface with a slope or unusual contour where the base vehicle cannot go, the extent of the boom and the rotation of the section 14 about its longitudinal axis will allow the edge of the tool to work on the surface rapidly and expediently at any desired angle.

It is seen that with this equipment, it is possible to extend or retract telescopic section 14, rotate section 14 90° in either direction, or do both simultaneously and independently. Furthermore, this action is accomplished simply by operation of the hydraulic control valves, thus readily producing motions which required several controls for brakes and cables or many hydraulic cylinders on previous machines. The motions produced by this invention can be very accurately controlled since the operation of a hydraulic cylinder is easily controlled with precision. Many different material working and handling devices, including a clam-shell scoop, winch, or a mower, may be mounted on this boom for dredging, digging, or maintaining earth surfaces. Also, the boom may be used in a variety of situations, including digging ice and snow, dredging under water, digging tunnels, or building military trenches and embankments.

Although only one embodiment of the invention has been described herein, various changes and modifications may be made without departing from the scope of the present invention.

I claim:
1. A material working and handling apparatus, comprising a vehicle, a platform on said vehicle rotatable on a vertical axis, power means for rotating said platform, a support means projecting upwardly from said platform and having two spaced members thereon, a boom pivotally mounted on said support means, said boom including a tubular base section, a pivot means with a horizontal axis connected to said base section and supported by said spaced members, hydraulic cylinders reacting between said base section and said platform for raising and lowering said base section about said pivot means, a tubular telescopic section in said base section slidable axially relative to said base section, three longitudinal tracks spaced around the periphery of said telescopic section, flanged rollers for each of said tracks, an annular means rotatably mounted on the exterior of said base section adjacent said telescopic section, means for mounting said rollers on said annular means, a cable having two portions extending parallel with said base section and a portion connecting said portions for movement with said annular means, a double acting hydraulic means connected to said portions for rotating said annular means and for thereby rotating said telescopic section relative to said base section, a hydraulic cylinder in said base section connected at one end to said base section and at the other end to said telescopic section for moving said telescopic section longitudinally relative to said base section, an end section rigidly secured at one end to said telescopic section and extending parallel therewith, a material handling device pivotally attached to the other end of said end section, hydraulic means mounted on said end section for pivoting and retaining in a selected position said material handling device, a hydraulic line connected to said last mentioned cylinder and extending along the upper side of said base section, a sheave for supporting said line above said base section, and a resilient means connected to said sheave and to said base section for retaining said last mentioned line in a taut condition.

2. A material handling apparatus, comprising a vehicle, a platform on said vehicle rotatable on a vertical axis, power means for rotating said platform, a support means projecting upwardly from said platform, a boom pivotally mounted on said support means, said boom including a tubular base section, a pivot means with a horizontal axis connected to said base section and mounted on said support means, hydraulic cylinders for raising and lowering said base section about said pivot means, a tubular telescopic section in said base section slidable axially relative to said base section, a plurality of longitudinal tracks spaced around the periphery of said telescopic section, flanged rollers for each of said tracks, an annular means rotatably mounted on the exterior of said base section adjacent said telescopic section, means for mounting said rollers on said annular means, a cable having two portions extending parallel with said base section and a portion connecting said portions for movement with said annular means, a double acting power means connected to said portions for rotating said annular means and for thereby rotating said telescopic section relative to said base section, a hydraulic cylinder in said base section for moving said telescopic section longitudinally relative to said base section, an end section rigidly secured at one end to said telescopic section, a material handling device pivotally attached to the other end of said end section, and power means for pivoting and retaining in a selected position said material working device.

3. An earth working and handling apparatus, comprising a vehicle, a platform on said vehicle rotatable on a vertical axis, a support means projecting upwardly from said platform, a boom pivotally mounted on said support means, said boom including a tubular base section, a pivot means with a horizontal axis connected to said base section and mounted on said support means, a hydraulic cylinder for raising and lowering said base section about said pivot means, a telescopic section in said base section slidable axially relative to said base section, a plurality of longitudinal tracks spaced around the periphery of said telescopic section, flanged rollers for each of said tracks, an annular means rotatably mounted on the exterior of said base section, means for mounting said rollers on said annular means, a flexible means having two portions extending parallel with said base section and a portion connecting said portions for movement with said annular means, a double acting hydraulic means connected to said portions for rotating said annular means and for thereby rotating said telescopic section relative to said base section, a power means for moving said telescopic section longitudinally relative to said base section, an end section secured at one end to said telescopic section, a material handling device attached to the other end of said end section, hydraulic means mounted on said end section, a hydraulic line connected to said last mentioned hydraulic means and extending along the upper side of said base section, a sheave for supporting said line above said base section, and a resilient means connected to said sheave and to said base section for retaining said last mentioned line in a taut condition.

4. An earth handling apparatus, comprising a vehicle, a platform on said vehicle rotatable on a vertical axis, power means for rotating said platform, a support means projecting upwardly from said platform, a boom pivotally mounted on said support means, said boom including a tubular base section, a telescopic section slidable axially relative to said base section, three longitudinal tracks spaced around the periphery of said telescopic section, rollers for each of said tracks, an annular means rotatably mounted on said base section adjacent said telescopic section, means for mounting said rollers on said annular means, a cable having a portion connected to and movable with said annular means, hydraulic means connected to said cable for rotating said annular means and for thereby rotating said telescopic section relative to said base section, a hydraulic cylinder connected at one end to said base section and at the other end to said telescopic section for moving said telescopic section longitudinally relative to said base section, a pivoted material handling device supported by said boom, and power means for pivoting said material handling device.

5. A material handling apparatus, comprising a vehicle, a rotatable platform on said vehicle, a support means projecting upwardly from said platform and having two spaced members thereon, a boom pivotally mounted on said support means, said boom including a tubular base section, a pivot means with a horizontal axis connected to said base section and supported by said spaced members, means for raising and lowering said base section about said pivot means, a telescopic section slidable axially relative to said base section, a plurality of longitudinal tracks spaced around the periphery of said telescopic section, a separate roller for engaging each of said tracks, an annular means rotatably mounted on said base section, means for mounting said rollers on said annular means, a flexible means having two portions extending parallel with said base section and a portion connecting said portions for movement with said annular means, power means connected to said portions for rotating said annular means and for thereby rotating said telescopic section relative to said base section, a hydraulic cylinder for moving said telescopic section longitudinally relative to said base section, an end section secured at one end to said telescopic section, and power means mounted on said end section for controlling a material working device.

6. In a material handling apparatus: a vehicle, a rotatable platform on said vehicle, a support means projecting upwardly from said platform, a boom pivotally mounted on said support means, said boom including a tubular base section, a pivot means with a horizontal axis connected to said base section and mounted on said support means, means reacting between said base section and said platform for raising and lowering said base section about said pivot means, a tubular telescopic section slidable axially relative to said base section, a plurality of longitudinal tracks spaced around the periphery of said telescopic section, rollers for each of said tracks, an annular means rotatably mounted on said base section, means for mounting said rollers on said annular means, a flexible means having two portions extending parallel with said base section and a portion connecting said portions for movement with said annular means, a double acting power means connected to said portions for rotating said annular means and for thereby rotating said telescopic section relative to said base section, and a power means connected at one end to said base section and at the other end to said telescopic section for moving said telescopic section longitudinally relative to said base section.

7. In a material working and handling apparatus: a vehicle, a rotatable platform on said vehicle, a support means projecting upwardly from said platform, a boom pivotally mounted on said support means, said boom including a tubular base section, a telescopic section slidable axially relative to said base section, a plurality of longitudinal tracks spaced around the periphery of said telescopic section, rollers for each of said tracks, an annular means rotatably mounted on said base section, means for mounting said rollers on said annular means, a flexible means connected to said annular means for movement therewith, power means connected to said flexible means for rotating said annular means and for thereby rotating said telescopic section relative to said base section, a power means for moving said telescopic section longitudinally relative to said base section, an end section secured at one end to said telescopic section, and a material handling device attached to the other end of said end section.

8. A boom for a material handling apparatus, comprising a tubular base section, a tubular telescopic section in said base section slidable axially relative to said base section, a plurality of longitudinal tracks spaced around the periphery of said telescopic section, flanged rollers for each of said tracks, an annular means rotatably mounted on said base section adjacent said telescopic section, means for mounting said rollers on said annular means, a cable having two portions extending parallel with said base section and a portion connecting said portions for movement with said annular means, a double acting hydraulic means connected to said portions for rotating said annular means and for thereby rotating said telescopic section relative to said base section, a hydraulic cylinder in said base section connected at one end to said base section and at the other end to said telescopic section for moving said telescopic section longitudinally relative to said base section, an end section rigidly secured at one end to said telescopic section and extending parallel therewith, hydraulic means mounted on said end section for controlling a material working device, a hydraulic line connected to said last mentioned hydraulic means and extending along the upper side of said base section, a sheave for supporting said line above said base section, and a resilient means connected to said sheave and to said base section for retaining said last mentioned line in a taut condition.

9. A boom for a material handling apparatus, comprising a tubular base section, a telescopic section slidable axially relative to said base section, a plurality of longitudinal tracks spaced around the periphery of said telescopic section, flanged rollers for each of said tracks, an annular means rotatably mounted on said base section, means for mounting said rollers on said annular means, a flexible means having two portions extending parallel with said base section and a portion connecting said portions for movement with said annular means, power means connected to said portions for rotating said annular means and for thereby rotating said telescopic section relative to said base section, a power means for moving said telescopic section longitudinally relative to said base section, an end section secured at one end to said telescopic section and extending parallel therewith, a material handling device attached to said end section, and power means for pivoting and retaining in a selected position said material handling device.

10. A boom for a material moving and placing apparatus, comprising a tubular base section, a telescopic section slidable axially relative to said base section, a plurality of longitudinal tracks spaced around the periphery of said telescopic section, rollers for each of said tracks, an annular means rotatably mounted on said base section, means for mounting said rollers on said annular means, a flexible means connected to said annular means for movement therewith, power means connected to said flexible means for rotating said annular means and for thereby rotating said telescopic section relative to said base section, and a power means for moving said telescopic section longitudinally relative to said base section.

11. In a boom having a tubular base section and an axially aligned telescopic section: means for moving said telescopic section axially relative to said base section, three longitudinal tracks spaced around the periphery of the telescopic section, flanged rollers for each of said tracks, an annular means rotatably mounted on the base section adjacent said telescopic section, means for mounting said rollers on said annular means, a cable having two portions extending parallel with said base section and a portion connecting said portions for movement with said annular means, and a double acting hydraulic means connected to said portions for rotating said annular means and for thereby rotating said telescopic section relative to said base section.

12. In a boom having a tubular base section and an axially aligned telescopic section: means for moving said telescopic section axially relative to said base section, a plurality of longitudinal tracks spaced around the periphery of said telescopic section, rollers for each of said tracks, an annular means rotatably mounted on said base section, means for mounting said rollers on said anular means, a flexible means having two portions extending parallel with said base section and a portion connecting said portions for movement with said annular means, and power means connected to said portions for rotating said annular means and for thereby rotating said telescopic section relative to said base section.

13. In a boom having a tubular base section and an axially aligned telescopic section: a plurality of longitudinal tracks spaced around the periphery of said telescopic section, rollers for each of said tracks, an annular means rotatably mounted on said base section, means for mounting said rollers on said annular means, a flexible means having two portions extending parallel with said base section and a portion connecting said portions for movement with said annular means, power means connected to said portions for rotating said annular means and for thereby rotating said telescopic section relative to said base section, and a power means for moving said telescopic section longitudinally relative to said base section.

14. In a boom having a tubular base section and an axially aligned telescopic section: means for moving said telescopic section axially relative to said base section, a plurality of longitudinal means on the periphery of said telescopic section, an annular means rotatably mounted on said base section, means on said annular means for engaging said longitudinal means, a flexible means connected to said annular means for movement therewith, and power means connected to said flexible means for rotating said annular means and for thereby rotating said telescopic section relative to said base section.

15. In a boom having a tubular base section and an axially aligned telescopic section: a plurality of longitudinal means on the periphery of said telescopic section, an annular means rotatably mounted on said base section, rollers mounted on said annular means for engaging said longitudinal means, a flexible cable-like means having two portions extending parallel with said base section and a portion connecting said portions for movement with said annular means, power means connected to said portions for rotating said annular means and for thereby rotating said telescopic section relative to said base section, and a power means for moving said telescopic section longitudinally relative to said base section.

16. In a boom having a tubular base section and an axially aligned telescopic section: a plurality of longitudinal means on the periphery of said telescopic section, an annular means rotatably mounted on said base section, rollers for supporting said longitudinal means, adjustable means for mounting said rollers on said annular means for engaging said longitudinal means, a flexible means connected to said annular means for movement therewith, and power means connected to said flexible means for rotating said annular means and for thereby rotating said telescopic section relative to said base section.

17. In a boom having a tubular base section and an axially aligned telescopic section: a plurality of longitudinal means on the periphery of said telescopic section, an annular means rotatably mounted on said base section, rollers for supporting said longitudinal means, means for mounting said rollers on said annular means for engaging said longitudinal means including an eccentric shaft for each roller and means for retaining said shafts in various adjusted positions, a flexible means connected to said annular means for movement therewith, and power means connected to said flexible means for rotating said annular means and for thereby rotating said telescopic section relative to said base section.

References Cited in the file of this patent
UNITED STATES PATENTS

| | | |
|---|---|---|
| 2,093,476 | Osgood | Sept. 21, 1937 |
| 2,833,422 | Ferwerda | May 6, 1958 |
| 2,949,201 | MacAlpine | Aug. 16, 1960 |